United States Patent [19]
Takayama et al.

[11] Patent Number: 5,699,097
[45] Date of Patent: Dec. 16, 1997

[54] DISPLAY MEDIUM AND METHOD FOR DISPLAY THEREWITH

[75] Inventors: Satoshi Takayama, Kawasaki; Masami Sugiuchi, Yokohama, both of Japan

[73] Assignee: Kabushiki Kaisha Toshiba, Kanagawa-ken, Japan

[21] Appl. No.: 426,127

[22] Filed: Apr. 20, 1995

[30] Foreign Application Priority Data

Apr. 22, 1994 [JP] Japan ................. 6-084461

[51] Int. Cl.$^6$ .............. B41M 5/36; B41J 2/325
[52] U.S. Cl. ............ 347/171; 347/221; 204/299 R; 204/180.1
[58] Field of Search ............... 347/171, 221; 204/180.1, 299 R

[56] References Cited

U.S. PATENT DOCUMENTS 4,298,448  11/1981  Muller et al. ................. 204/299 R

FOREIGN PATENT DOCUMENTS 55-154198  12/1980  Japan .
57-82086   5/1982   Japan .

OTHER PUBLICATIONS

"Electrophoretic Display Technology," IEEE Transactions on Electron Devices, vol. ED–24, No. 7 (Jul. 1977), pp. 827–834.

Ota et al.; "Electrophoretic Image Display (EPID) Panel", Proceeding of the IEEE, vol. 61, No. 7, Jul. 1973 pp. 832–836.

Shiwa et al.; "Electrophoretic Display Method Using Ionographic Technology" SID 88 Digest pp. 61.-62.

Sasaki et al.; "Liquid–crystal Thermo–optic Effects and Two New Information Display Devices", Journal of Applied Physics, vol. 45, No. 10 Oct. 1974.

Primary Examiner—Huan H. Tran
Attorney, Agent, or Firm—Finnegan, Henderson, Farabow, Garrett & Dunner, L.L.P.

[57] ABSTRACT

A method for display on a display medium is disclosed which comprises a step of applying an electric field to a display medium provided with an image forming medium composed of a thermally fusible material and minute charging particles dispersed therein, a step of applying heat to the display medium until the thermally fusible material assumes a coefficient of viscosity enough for the minute charging particles to migrate by dint of an electric field, and a step of solidifying the image forming medium after formation of an image therein.

20 Claims, 9 Drawing Sheets

FIG. 1
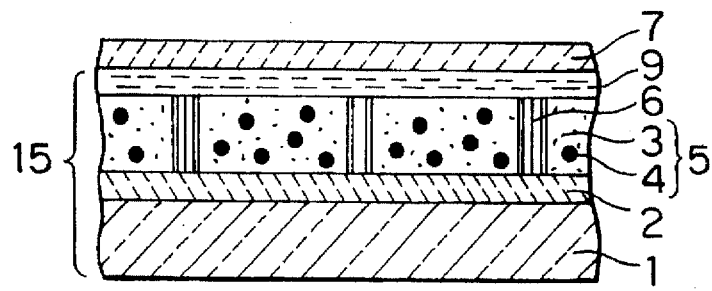
FIG. 2
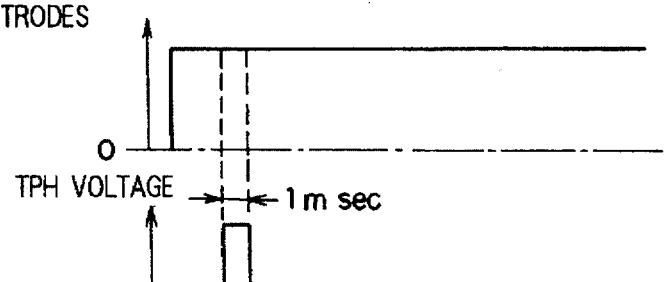
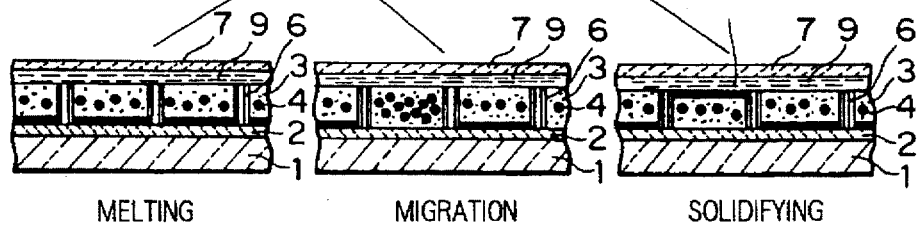
MELTING     MIGRATION     SOLIDIFYING

TOSHIBA RELAY TABLE CARD

ELECTRODE FORMATION

SPACER IS JOINED

DISPERSION SOLUTION

APPLYING DISPERSION SOLUTION

DRYING (DIVIDING ELEMENT)

TRANSPARENT SURFACE FILM FORMATION

HEAT TREATMENT

FIG. 7A  COATING
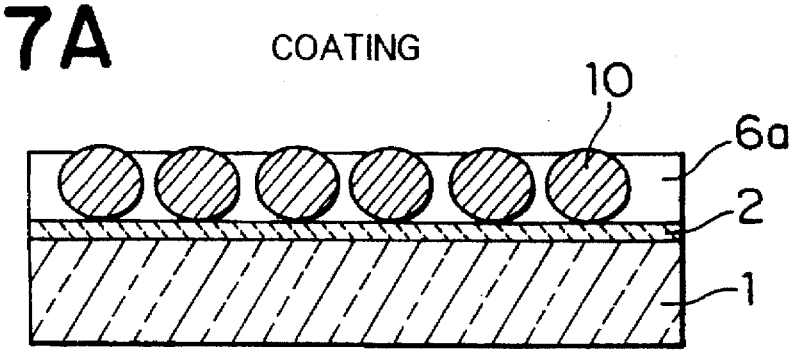
FIG. 7B  DRYING
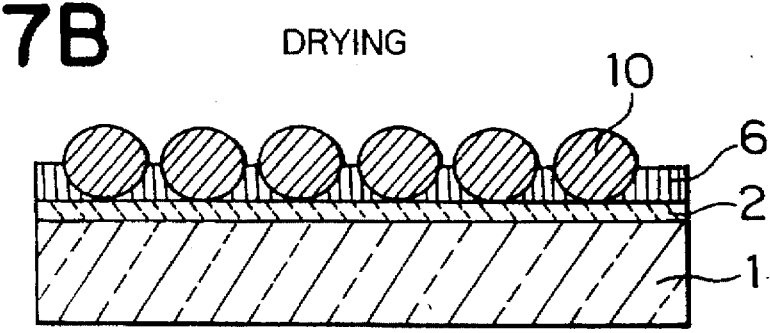
FIG. 7C  PMMA EXPULSION
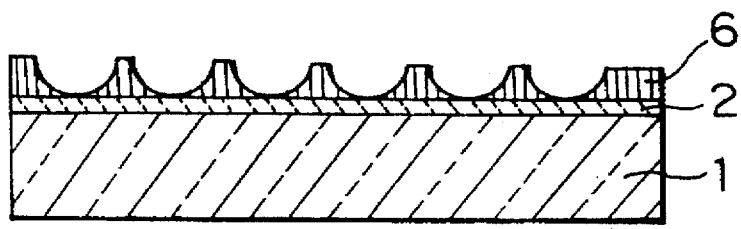
FIG. 7D  IMAGE FORMING MEDIUM CASTING
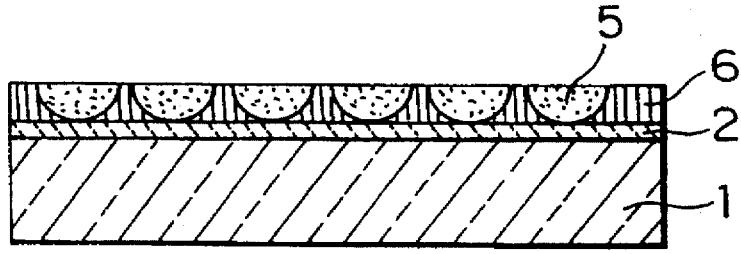

FIG. 8A  COATING
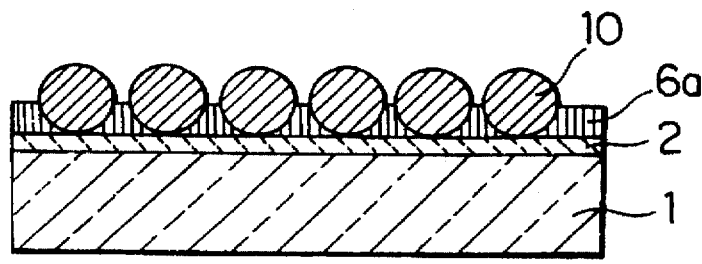
FIG. 8B  UV IRRADIATION
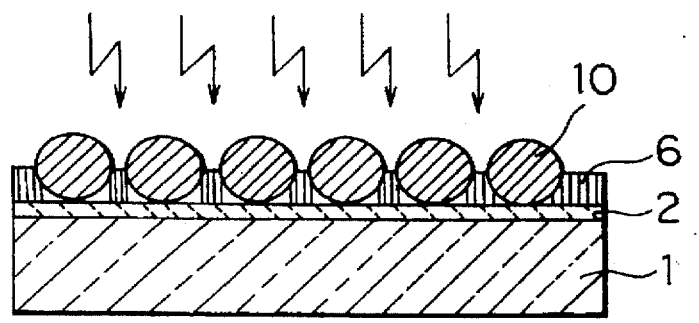
FIG. 8C  PMMA AND MONOMER EXPULSION
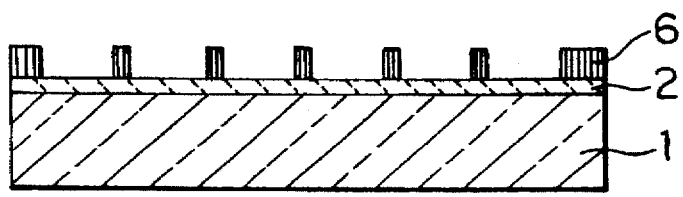
FIG. 8D  IMAGE FORMING MEDIUM CASTING
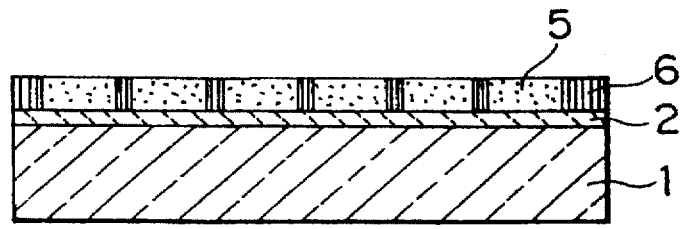

FIG. 9A   SCREEN PRINTING
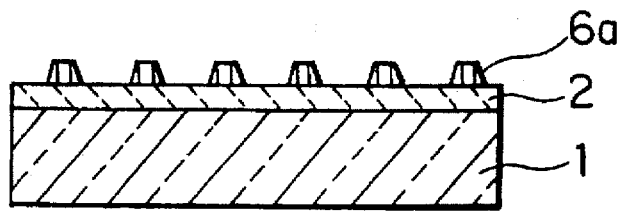
FIG. 9B   HEAT TREATMENT
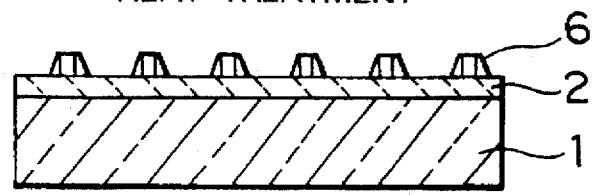
FIG. 9C   SCREEN PRINTING
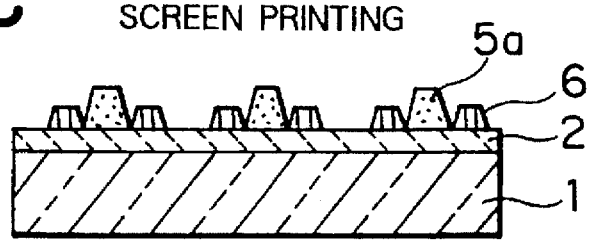
FIG. 9D   HEAT TREATMENT
FIG. 9E   HEAT TREATMENT
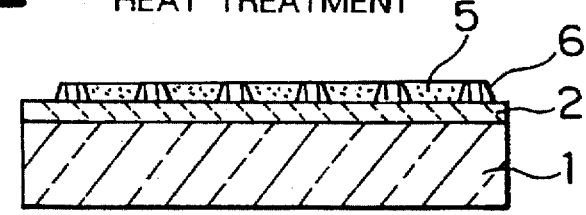

DISPLAY MEDIUM AND METHOD FOR DISPLAY THEREWITH

BACKGROUND OF THE INVENTION

1. Field of the Invention

This invention relates to a novel display medium, more particularly display medium which is suitable for a card having a rewritable display surface or a portable display device (display paper, for example) having no need of energy for retaining display, and a method for the display by means thereof.

2. Description of the Related Art

In recent years, owing to the dissemination of office automation, the amounts of various kinds of information have been continuously growing and the amounts of outputs of information have been increasing at the same pace. The outputs of information are represented by the hard copy display produced on papers by means of a printer and the monitor display. The hard copy display has the problem of entraining heavy consumption of paper and therefore counteracting the principle of preservation of resources and the monitor display has the problem of requiring an electric circuit of large scale for its display surface and therefore neither permitting a cut in cost of the display medium nor rendering the display medium portable. Thus, the appearance of a wholly solid or semisolid rewritable display medium which is capable of multitudinous repeating cycles of alternately recording and erasing an image of high visual discernibility and further capable of retaining a desired image without requiring any energy has been longed for as a display medium of the third generation.

Heretofore, as a rewritable display medium, an organic low molecular-high molecular resin matrix type medium (disclosed in JP-A-55-154,198 and JP-A-57-82,086, for example) which is made to record and erase an image by means of a thermal printer head (hereinafter referred to as "TPH") has been known. This organic low molecular-high molecular resin matrix type rewritable display medium, however, has problems such as a relatively small number of the order of about 150 to 500 cycles of alternately recording and erasing an image and a narrow range of usable working temperature. It, therefore, cannot be adapted, for example, for a railway station grade IO card which needs a wide range of working temperature.

Studies are now under way concerning an electrophoretic element which utilizes particles exhibiting electrophoresis (as disclosed in I. Ota et al., Proceedings of the IEEE, vol. 61, p. 832 (1973), for example). FIG. 12 is a schematic cross section showing the electrophoretic element.

The electrophoretic element in its fundamental construction comprises a transparent electrode 9 formed on a transparent substrate 12 (such as glass, for example), an image forming medium formed of a suspension 13 having dispersed therein minute charging particles 4 as electrophoretic particles, a counter electrode 2 formed on a supporting substrate 1, and a spacer 14 serving to maintain a fixed distance between the transparent electrode 2 and the counter electrode 2. Here, at least either of the counter electrode 2 and the transparent electrode 9 is divided in conformity to individual picture elements of a particular image. This image is formed by subjecting the picture signals conforming to the individual picture elements to electric scanning and controlling the motion of migrating particles with the aid of the picture signals transmitted in response to the picture elements.

In the electrophoretic element which uses a liquid as an image forming medium as described above, however, the migrating particles such as of a pigment which are dispersed in the image forming medium are gradually sedimented and agglomerated when the supply of an electric energy from an external source is stopped. As a result, the image formed in the electrophoretic element undergoes change of density with the elapse of time. This characteristic quality has prevented the electrophoretic element from being adapted for portable implements.

SUMMARY OF THE INVENTION

An object of this invention is to provide a rewritable display medium which allows repeating use and a method for the display by the use thereof.

Another object of this invention is to provide a rewritable display medium which is capable of retaining a formed image even in the absence of supply of energy.

Yet another object of this invention is to provide a rewritable display medium which excels in stability of retention of a formed image and in mechanical strength as well.

The method for display with the display medium of this invention furnished with an image forming medium consisting of a thermally fusible material having minute charging particles dispersed therein, which method comprises a step of applying an electric field to the display medium, a step of applying heat to the display medium, and a step of solidifying the medium which has formed an image therein.

This invention further concerns a display medium comprising a housing having at least one surface thereof formed of a transparent material and an image forming medium consisting of a thermally fusible material disposed in the housing and minute charging particles dispersed in the thermally fusible material, characterized by effecting the formation of an image by applying heat and an electric field required for the formation of an image to the housing thereby forming the image in the image forming medium and subsequently solidifying the image forming medium.

The display medium of this invention is also characterized by being furnished with a housing having at least one surface thereof formed of a transparent material and an image forming medium consisting of a thermally fusible material disposed in the housing and minute charging particles dispersed in the thermally fusible material.

BRIEF DESCRIPTION OF THE DRAWINGS

FIG. 1 is a schematic partially sectioned diagram showing one example of the display medium of this invention.

FIG. 2 is one example of the drive timing diagram according to this invention.

FIG. 7A through FIG. 7D are diagrams showing sequentially the component steps of the process for the production of one image forming medium and a spacer member according to this invention.

FIG. 8A through FIG. 8D are diagrams showing sequentially the component steps of the process for the production of another image forming medium and a spacer member according to this invention.

FIG. 9A through FIG. 9E are diagrams showing sequentially the component steps of the process for the production of an image forming medium and a spacer member adapted for impartation of multiple colors to an image forming medium.

DESCRIPTION OF THE PREFERRED EMBODIMENTS

Figure 3A:
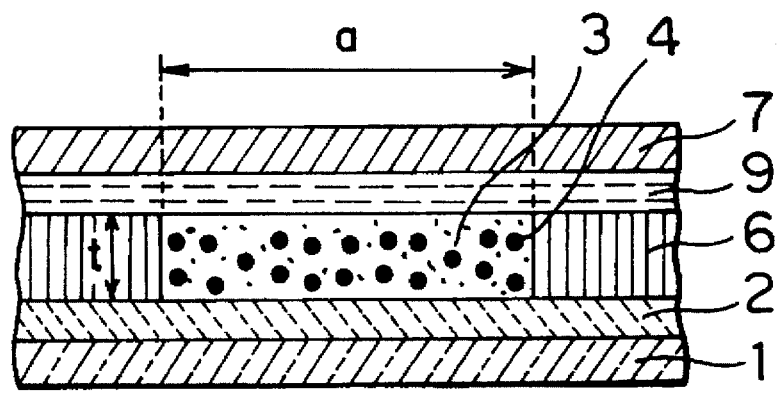
FIG. 3A is a schematic cross section of an electrophoretic property evaluating cell according to this invention.

Now, this invention will be described more specifically below with reference to FIG. 1.

The display medium of this invention, as shown in the diagram, comprises a housing 15 provided with a counter electrode 2 and a transparent electrode 9 both formed on a supporting substrate 1, spacer members 6 disposed between the counter electrode 2 and the transparent electrode 9 and enables to divide the housing 15 into component cells, an image forming medium 5 embraced in empty spaces which are separated by the spacer members, and a transparent coating film 7 formed on the transparent electrode 9. The image forming medium 5 is composed of a thermally fusible insulating material 3 and minute charging particles 4 dispersed as migrating particles in the thermally fusible material 3.

When the thermally fusible material 3 is melted by heating the display medium constructed as described above and a voltage is applied to the electrodes 2 and 9, the minute charging particles 4 are electrically migrated by an electric field in the thermally fusible material 3 which has been converted into a migrating medium. As a result, the display medium is enabled to effect desired display. A hue originating in the minute charging particles 4 is displayed from the transparent electrode 9 side when electrophoresis is caused on the transparent electrode 9 side and a hue originating in the thermally fusible material 3 is displayed from the transparent electrode 9 side when electrophoresis is caused on the counter electrode 2 side. Since the minute charging particles 4 can be immobilized by stopping the supply of heat to the display medium which has displayed an image (spontaneous cooling) thereby solidifying the thermally fusible material 3, the display medium of this invention is enabled to retain the displayed image even in the absence of supply of an electric energy.

Now, the method of this invention for display and the mechanism of this display will be described below.

The following formula (1) has been known as a theoretical formula for approximating the time of electrophoresis of minute charging particles [A. L. Dariga. IEEE Transaction on Electron Devices, Vol. ED-24 (7), p. 827 (1977)].

$$t = \frac{6\pi\eta L}{\epsilon\zeta E} = \frac{6\pi\eta L^2}{\epsilon\zeta V} \quad (1)$$

wherein t stands for the time of migration of minute charging particles 4, η for the coefficient of viscosity of the thermally fusible material 3, L for the distance between the electrodes 2 and 9, ε for the dielectric constant of the thermally fusible material 3, E for the intensity of the electric field to be applied, ζ for the zeta potential (several to one hundred and some tens of mV), and V for the applied voltage.

The introduction of a picture signal by the application of heat will be described more specifically below.

Preparatorily to the issuance of a picture signal, a uniform DC electric field is exerted on the image forming medium 5 by applying a voltage to the transparent electrode 9 and the counter electrode 2. Thereafter, the picture signal is applied in the form of heat as by TPH, for example, at a recording speed of within 1 ms per line. The heat exerted by the TPH elevates the temperature of the image forming medium 5 through the medium of the transparent coating film 7 and causes phase change of the thermally fusible material 3 into a fluid state. The minute charging particles 4 are migrated by the Coulomb force in the thermally fusible material 3 converted by heating into a migrating medium and eventually allowed to reach and deposit on the transparent electrode 9 before the thermally fusible material 3 in the molten state is solidified. As a result, the parts of the transparent electrode 9 on which the minute charging particles 4 have been deposited assume the color of the minute charging particles 4 as viewed from the transparent electrode 9 side. Since the minute charging particles 4 which remain in an unfused state (unheated part) in the thermally fusible material 3 are immobilized and prevented from manifesting electrophoresis without reference to the presence or absence of charging, they assume the color of the background or the color due to the thermally fusible material 3 when viewed from the transparent electrode 9 side. As a result, there is formed an image which consists of the hue due to the minute charging particles 4 and the hue due to the thermally fusible material 3. When the thermally fusible material in the state mentioned above is cooled (spontaneously, when necessary), it is immobilized with the image retained fast therein. Since this invention utilizes the thermally fusible material 3 as a migrating medium as described above, the minute charging particles 4 in the image forming medium 5 are immobilized by the solidification having occurred on the thermally fusible material 3 and are prevented from inducing any change of the image density due to aging.

Though it has been described that the application of the electric field is attained through the medium of the electrode, it is allowable to attain the application of an electric field to the display medium by installing an electrostatic body in the place of the electrode and electrically charging the surface of the electrostatic body.

The method which discerns as a pattern the part in which heat has been applied to the display medium having a DC field uniformly applied thereto as mentioned above further excels in respect that the manufacture of the display medium can be simplified. Specifically, in contrast to the conventional electrophoretic element which requires application of an electric field to each of the picture elements in order to effect display, this invention is only required to apply an electric field to the whole display medium and, therefore, is not required to form an electric field in each of the picture elements.

Further, the method which implements the introduction of picture signals by means of heat as described above is particularly advantageous in respect that the introduction of picture signals can be expedited when display media are simultaneously moved and made to effect quick recording as in the case of the operation of an automatic ticket checker. The advantage under discussion will be explained with reference to FIG. 2. FIG. 2 is one example of the drive timing diagram depicting the introduction of a picture signal by heating into a display medium of this invention using a suitable thermally fusible material. As shown in the diagram, the thermally fusible material can be heated to above the melting point thereof within a period of about 1 ms by the use of TPH, for example, while the entire display medium is kept under continued application of an electric field. The molten state which the thermally fusible material assumes after one round of the heating can be retained for not less than 30 ms owing to the heat storing effect of the material and the supercooling property of the image forming medium. Even when the display medium is in motion at a high speed, the application of a voltage can be attained with a simple device and the molten state can be easily retained after the application of heat.

Further, the method is characterized by the fact that the manufacture of a color display is facilitated by introducing the principle of screen printing .or thermal ink transfer printing into the formation of an image forming medium as will be explained in detail in working examples to be cited hereinafter.

The display medium of this invention allows an image formed thereon to be easily erased and rerecorded. First, the image formed in the display medium can be erased to reset the display medium by applying a bias electric field to and heating the whole display medium. Specifically, the image can be erased by causing minute charging particles adhering to an electrode to be moved toward the corresponding counter electrode by dint of electrophoresis. The application of heat for the erasure of an image may .be executed by means of a heat roller or an infrared lamp. The rerecording of an image immediately after the erasure thereof is desirably attained by having a write system disposed in the display medium, preheated before writing, and enabled to effect quick recording.

The means for introducing picture signals into the display medium of this invention is not limited to the application of heat. For example, a method which consists in providing a display medium with a medium capable of applying an electric field such as an electrode to each of the picture elements and controlling the electric field applied to each of the electrodes may be adopted instead. In this case, the thermally fusible material is transformed into a molten state by heating the whole display medium.

Now, the material of which the display medium of this invention is formed will be described below.

Since the thermally fusible material according to this invention is intended as a migrating medium for the minute charging particles, the coefficient of viscosity of the material in the molten state deserves an important consideration. This is because the period of migration of the minute charging particles can be shortened, namely the speed of display can be heightened, by lowering the coefficient of viscosity of the thermally fusible material serving as a migrating medium as inferred from the theoretical formula (1) mentioned above. The coefficient of viscosity of the thermally fusible material in the molten state is desired to be not more than $5 \times 10^{-5}$ $m^2 s^{-1}$ as kinetic viscosity at 120° C. The kinetic viscosity of this material at 100° C. is desired to be not more than $1 \times 10^{-4}$ $m^2 s^{-1}$, preferably not more than $0.2 \times 10^{-4}$ $m^2 s^{-1}$.

Under the temperature condition of the environment in which the display medium is used, the melting point of the thermally fusible material is desired to be not less than 40° C. preferably not less than 50° C. and more preferably not less than 60° C. The reason for the limited melting point is that the display medium of this invention is possibly used in the atmosphere of high temperature such as the interior of a closed car. The material is desired to be such that the coefficient of elasticoviscosity thereof (coefficient of kinetic viscosity) falls through at least four decimal places within a temperature range extending over 20° C. in both directions from the melting point.

The thermally fusible materials which are advantageously usable in this invention are such organic materials as contain a carboxyl group (—COOH), an alcoholic hydroxyl group (—OH), an amino group (—$NH_2$), or a carbonyl group (>CO) in the molecular unit thereof. Such fusible organic materials as paraffins, for example, may be vested with an improved property to migrate minute charging particles by incorporating therein such an additive as surfactant in an amount of the order of several percents. Naturally, the thermally fusible material to be used must be an insulating substance.

As concrete examples of the thermally fusible material of the quality described above, various waxes, saturated fatty acids, and higher alcohols which are enumerated below may be cited: Higher monohydric alcohols such as stearyl alcohol, 1-eicosanol, 1-docosanol, 1-tetracosanol, 1-hexacosanol, and 1-octacosanol; linear higher polyhydric alcohols such as 1,8-octane diol, 1,10-decane diol, 1,12-dodecane diol, 1,12-octadecane diol, 1,2-dodecane diol, 1,2-tetradecane diol, and 1,2-hexadecane diol; higher fatty acids such as palmitic acid, stearic acid, 1-octadecanoic acid, behenic acid, 1-docosanoic acid, 1-tetracosanoic acid, 1-hexacosanoic acid, and 1-octacosanoic acid; linear higher polyhydric fatty acids such as sebacic acid, dodecanoic acid, and 1,12-dodecane dicarboxylic acid; alicyclic alcohols such as cyclododecanol, 1,2-cyclohexane diol, and 1,4-cyclohexane diol; steroids such as cholesterol, stigmasterol and lanosterol; vegetable waxes as carnauba wax and candelilla wax; animal waxes such as beeswax and lanolin; mineral waxes such as montan wax; and petroleum type synthetic waxes such as alcohol type waxes and urethane type waxes.

The minute charging particles are such a substance as is enabled to manifest electrophoresis by being charged positively or negatively in the thermally fusible material in the molten state. Specifically, such inorganic powders (pigments) as $TiO_2$ and $BASO_4$ and organic pigments are usable as the minute charging particles defined above. The inorganic oxide type pigments which are shown below are particularly suitable materials.

Such inorganic oxides as $TiO_2$, $Al_2O_3$, and $SiO_2$ may be cited as white materials, Cd—Se type oxides as red materials, Ti—Ba—Ni type oxides as yellow materials, Co—Al type oxides as blue materials, Ti—Zn—Ni—Co type oxides as green materials, and Cu—Fe—Mn type oxides as black materials. Such inorganic powders as $TiO_2$ may be used as coated with a material of a different species.

The minute charging particles to be used for this invention are desired to have a particle diameter in the range of from 0.01 μm to 5 μm. If the particle diameter is less than 0.01 μm, the image forming medium will possibly offer an increased viscous drag, the speed of electrophoresis will decrease, and the display speed will fall. Conversely, if the diameter exceeds 5 μm, the minute charging particles will be deficient in dispersibility and the delineation of image will be insufficient.

The content of the minute charging particles in the image forming medium is generally in the range of from 5 to 50% by weight. This range is not critical, for the minute charging particles are only required to be contained in an amount enough to form a visually discernible image in the image forming medium. Thus, the content may be in the range of from 1 to 90% by weight.

Further, for the purpose of improving the visual discernibility of the image, it is permissible to have a coloring dye or a pigment dispersed in the thermally fusible material or in the minute charging particles. In this case, it is necessary that the coloring dye or the pigment be selected in consideration of the charging property thereof. When a dye is selected, the diffusion of the dye by the agency of heat must be taken into account. The dyes advantageously usable for the purpose include those dyes which contain a benzene ring and a —$NR_2$ group or a —NHR group, for example. As concrete examples, anthraquinone type dyes (Waxolines), triphenyl methane type dyes (rhodamines), and mordant azo dyes (nigrosins) may be cited.

When any part of the display medium of this invention is deficient in resistance to heat, that part may be provided with a heat-resistant film. This film is desired to resist heat at a continuous working temperature of not less than 120° C., preferably not less than 150° C. It is particularly desirable to use a plastic sheet for the film on account of flexibility. Generally, a transparent material is subjected to heating. Naturally, the film to be used in this case is required to be made of a transparent substance. As concrete examples of the transparent substance, polyester type films such as PET film and PBT film and PES films may be cited.

If the heat applied to the display medium is conducted in the lateral direction, the display medium will possibly fail to form a clear image. Thus, the display medium is desired to be divided into plural elements as with spacer members. The substance for these spacer members is desired to have a melting point of not less than 60° C. and a melt index of not more than 50 at a temperature of 120° C. or to have a melting point of not less than 150° C. The substance for the spacer members must not exhibit perfect compatibility with the thermally fusible material when they are melted or softened. As concrete examples of the substance which is effectively usable for the spacer members, acrylic type polymers, silicone type polymers, polyethylene type polymers (such as, for example, EEA, EAA, EMAA, PE, and EVA), polyimide type polymers, polyamide type polymers, polyolefin type polymers other than polyethylene type polymers, polyester type polymers, polystyrene type polymers, polycarbonate type polymers, and polyvinyl alcohol type polymers may be cited. As means for the formation of the spacer members, a method which comprises mixing a dispersion of the substance for the spacer members with a solution of the image forming medium thereby preparing a mixed coating liquid and applying this coating liquid to a surface thereby forming the spacer members simultaneously with the image forming medium, a method which comprises preparing a film of the substance for the spacer members having dispersed therein the thermally fusible particles and melting and removing the particles from the film, a method of screen printing, and a method of thermal ink transfer printing may be cited. The display medium, when furnished with such spacer members as mentioned above, is enabled to acquire enhanced mechanical strength.

In association with the formation of-the spacer members, the average diameter of the image forming medium, seen in a top view of the elements which is divided by the spacer members, is desired to be not less than 5 μm for the sake of preventing the spacer members from offering unduly large viscous drag and not more than 5 mm for the sake of preventing the composition distribution of the image forming medium from being varied by repeated use. When the thermally fusible material produces a change of volume of 2% or more when it is melted and when it is solidified, this average diameter is desired to be not more than 1 mm (for the purpose of precluding the occurrence of a short circuit between electrodes owing to a defect of the film of the image forming medium).

When the electrodes are covered as with the film as described above, the sheet resistance is desired to be not more than 500 $\Omega/cm^2$. The intensity of the electric field to be used is sufficient in the range of from $1\times10^5$ to $1\times10^7$ V/m (more desirably in the range of from $5\times10^5$ to $5\times10^6$ V/m).

The thickness of the image forming medium is desired to be not less than 1 μm in the light of the allowable limit of the contrast ratio of image and to be not more than 100 μm in the light of the allowable limit of the period of migration. More specifically, this thickness is desired to be not less than 3 μm for the sake of preventing the occurrence of a short circuit between the electrodes owing to a defect of the film of the image forming medium and not more than 15 μm for the sake of ensuring quick supply of heat to the image forming medium by the use of TPH, for example. The thickness of the heat-resistant film is desired to be not less than 0.3 μm from the viewpoint of resistance to wear and to be not more than 10 μm for the sake of ensuring quick supply of heat to the image forming medium by the use of TPH, for example.

Now, this invention will be described below with reference to concrete examples.

First, minute charging particles (migrating particles) of uncoated $TiO_2$ (average particle diameter 0.3 μm) in varying waxes as a thermally fusible material were tested for charging polarity. The results are shown in Table 1. For the coloration of the thermally fusible material, a anthraquinone type dye (Waxoline, RED MP-FW) was dispersed therein at a weight ratio of 10%.

TABLE 1

Kind of thermally fusible material and charging property thereof

| Kind of wax*[1] | Polar group contained | Charging polarity |
|---|---|---|
| NPS 92.10*[2] | —OH | + |
| NPS 6010*[3] | —$NH_2$, >CO, —COOH | − |
| Stearic acid | —COOH | + |
| Behenic acid | —COOH | + |
| Fatty acid alcohol amide | —$NH_2$, >CO | + |
| Carnauba wax | —OH, >CO, —COOH | + |
| Candelilla wax | —OH, >CO, —COOH | + |
| Catechol stearic diester | >CO | − |

*[1]No surfactant incorporated in the wax as thermally fusible material.
*[2]Alcohol type wax (produced by Nippon Seiro K.K.).
*[3]Urethane typewax (produced by Nippon Seiro K.K.).

It is remarked from the test results of Table 1 that the uncoated $TiO_2$ was charged positively in the thermally fusible materials containing the groups of —OH and —COOH. In such materials as paraffins ($C_nH_{2n+2}$) which do not contribute to transfer of electrons, the uncoated $TiO_2$ was hardly charged in the absence of a surfactant. In the waxes shown in Table 1, alcohol type waxes, fatty acid glycol esters, carnauba wax, and candelilla wax were charged with high repeatability and responded rather quickly. The thermally fusible materials which contain a hydroxyl group and a carboxyl group are desirable for the purpose of enabling the uncoated $TiO_2$ to acquire a positive charging property. Conversely, the thermally fusible materials containing an amino group are desirable for the purpose of enabling the uncoated $TiO_2$ to acquire a negative charging property.

As the materials for the image forming medium in the display device, the thermally fusible material, the minute charging particles, and optionally additives are so widely varied in kind and composition as to permit a huge number of combinations. To select a set of materials which fits this device, it is necessary that the selection of materials be made in accordance with the formula of approximation of electrophoresis. It is also necessary that a prospective image forming medium be tested for electrophoretic property at an elevated temperature and the combination of selected materials be superbly appropriate for the electrophoretic property. Table 2 and Table 3 show the electrophoretic properties of concrete combinations of materials. The data shown in Table 2 and Table 3 have been determined under the conditions of 120° C. of sample temperature, ±100 V of applied voltage, 50 μm of spacer thickness, and 2 mm×5 mm of window size. The samples used for the test had a composition of 10 parts by weight of a thermally fusible material, 5 parts by weight of minute charging particles, and 1 part by weight of a dye. For the samples of Table 2, Waxoline Red MP-FW (produced by Japan ICI) and Waxoline Blue MP-FW (produced by Japan ICI) were used. For the samples of Table 3, Waxoline Red MP-FW (produced by Japan ICI) were used.

TABLE 2

Time for change of hue by difference of minute charging particles (1)

| Kind of wax | Minute charging particles | Designation | Hue | Particle diameter (μm) | Charging property | Time of migration (s) |
|---|---|---|---|---|---|---|
| NPS 9210 (Alcohol type) | $TiO_2$ | TA-100 | White | 0.3 | + | 1–3 |
| | | coarse grained titanium dioxide | White | 1–2 | + | 5–7 |
| | Inorganic Pigment (metal oxide) | #650 × 4 | Red | 0.9 | + | 1–2 |
| | | #9320 × 4 | Green | 1.2 | + | 0.3–1.0 |
| | | #9412 × 4 | Blue | 1.0 | + | 0.1–0.2 |
| | | #9110 × 4 | Yellow | 1.1 | + | 0.1–0.2 |
| NPS 6010 (Urethane type) | $TiO_2$ | TA-100 | White | 0.3 | − | 25–30 |
| | Inorganic Pigment (metal oxide) | #650 × 4 | Red | 0.9 | − | 1–4 |
| | | #9320 × 4 | Green | 1.2 | − | 20–30 |
| | | #9412 × 4 | Blue | 1.0 | + | 15–20 |
| | | #9110 × 4 | Yellow | 1.1 | − | 7–10 |

*[4]: This inorganic pigment (metal oxide) was a product of Dainichiseika K. K.

TABLE 3

Time for change of hue by difference of minute charging particles (2)

| Kind | Designation | Charging polarity | Time of migration (s) | Polar group contained | Melting point (°C.) |
|---|---|---|---|---|---|
| Alcohol type*[5] | NPS 9125 | + | 10–20 | —OH, >CO, —COOH | 63 |
| | NPS 9210 | + | 1–3 | —OH, >CO, —COOH | 75 |
| | Stearyl alcohol | + | 0.1–0.5 | —OH | 59 |
| Saturated fatty acids | Lauric acid | + | 0.1–0.3 | —COOH | 44.8 |
| | Palmitic acid | + | 0.1–0.3 | —COOH | 62.7 |
| | Stearic acid | + | 0.1–0.3 | —COOH | 70.5 |
| | Behenic acid | + | 0.1–0.3 | —COOH | 80 |
| Saturated fatty | Dodecane | + | 0.1–0.3 | —COOH | 127 |

TABLE 3-continued

Time for change of hue by difference of minute charging particles (2)

| Kind | Designation | Charging polarity | Time of migration (s) | Polar group contained | Melting point (°C.) |
|---|---|---|---|---|---|
| dicarboxylic acids | dicarboxylic acid | | | | |
| Urethane type*[5] | NPS 6010 | − | 25–30 | —$NH_2$, >CO, —COOH | 75 |
| | NPS 6115 | + | 1–5 | —$NH_2$, >CO, —COOH | 77 |
| | HAD 5080 | + | 2–8 | —$NH_2$, >CO, —COOH | 75 |
| Carnauba type*[6] | HX-A-01A | + | 7–15 | —OH, >CO, —COOH | 83 |
| Candelilla type*[6] | NC 1630 | + | 1–5 | —OH, >CO, —COOH | 75 |

*[5]: Product of Nippon Seiro K. K.
*[6]: Product of Noda Wax K. K.

Figure 3B:
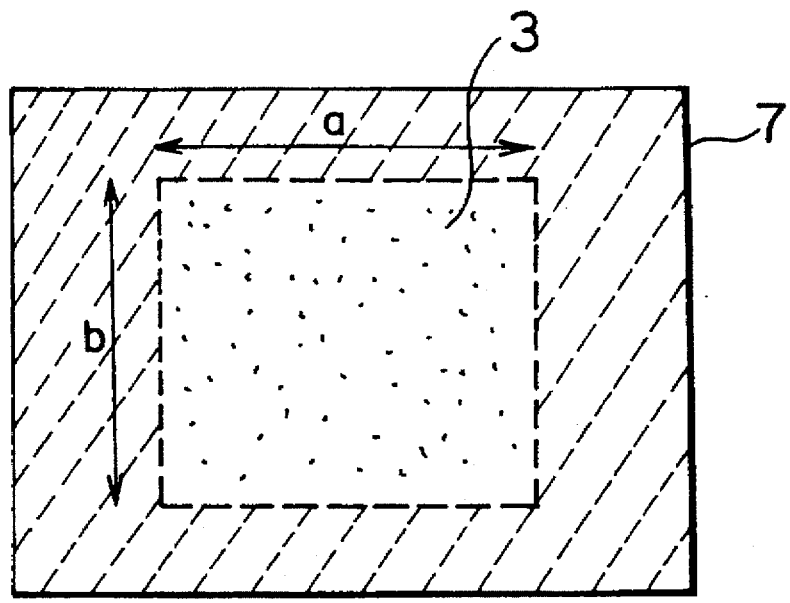
FIG. 3B is a schematic plan view of an electrophoretic property evaluating cell according to this invention.

FIG. 3A is a schematic cross section of an electrophoretic property evaluating cell and FIG. 3B a top view of the cell. In these diagrams, like parts found in FIG. 1 are denoted by like reference numerals. The symbols a, b, and t respectively stand for a major side, a minor side, and a thickness of a rectangular solid. The present inventors, as a result of trial and error, have selected 2 mm×2 mm for a×b and 50 µm for t. If a and b are increased (or when t is decreased), the problem that the electrophoresis is generated in the lateral direction and the composition is consequently diverged, the problem that the material of the image forming medium, when melted, is caused by surface tension to disappear through the edge of the cell, and the problem that the image forming medium, because of a change of volume during the course of recrystallization, sustains a crack and forms a short circuit between the layers will ensue. It has been consequently ascertained to the inventors that the ratio of a×b to t is desired to be such that the surface area of the cell is not more than 4 mm² when the thickness t is about 50 µm as mentioned above. The range of the desirable average diameter of the divided cells and the range of the desirable thickness of the image forming medium are determined on the basis of the results of the test for electrophoretic property. For the test, the cell temperature is fixed at 120° C.±10° C. and the voltage is applied in the form of a square wave of 0 V to 100 V. In this test, the response frequency of this square wave, the number of repetitions, and the contrast ratio are determined. A composition showing a response frequency of not less than 10 Hz, a number of repetitions of not less than $10^6$, and a contrast ratio of not less than 1:15 is evaluated as acceptable. One example of the acceptable composition is shown in weight ratio below.

| | |
|---|---|
| Alcohol type wax, NPS9210 (product of Nippon Seiro K.K.) | 59% |
| Titanium dioxide particles, TA-100 (product of Fuji Titan Kogyo K.K.) | 32% |
| CCA, TNS-2 (product of Hodogaya Chemical Co., Ltd.) | 3% |
| Dye, Waxoline Red (product of Japan ICI) | 6% |

For the purpose of improving the photostability of the background color, a colored pigment of different electrophoretic property (such as, for example, polarity or mobility) is used in the place of a dye (phthalocyanine green and titanium dioxide particles used as minute charging particles, for example). The pigment shows virtually no sign of thermal diffusion and the color thermally imparted to the transparent film is negligible. Since the pigment nevertheless tends to gain in viscosity when melted as compared with the dye, it is not comparable with the dye in terms of high speed response property.

Figure 4A:
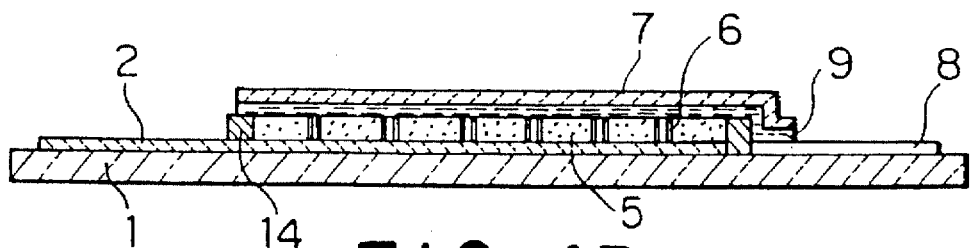
FIG. 4A is a longitudinal cross section showing another example of the display medium of this invention.
Figure 4B:
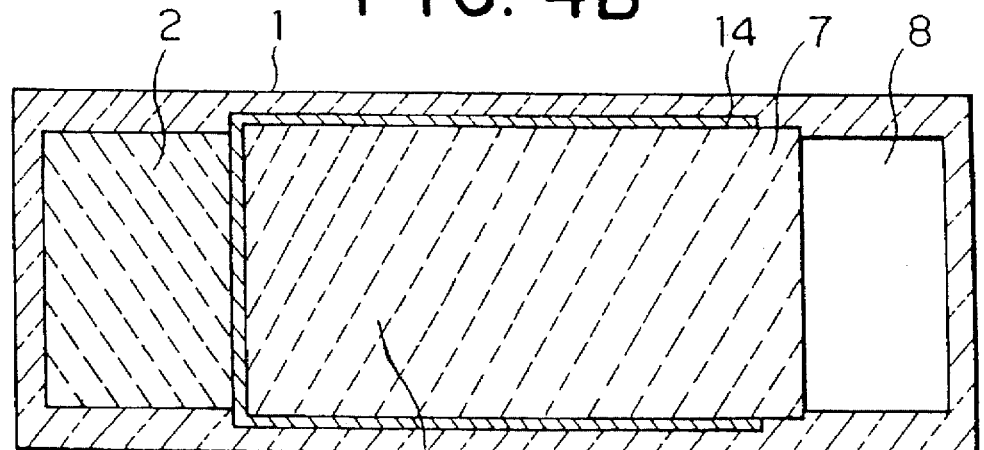
FIG. 4B is a plan view showing another example of the display medium of this invention.

FIG. 4A is a longitudinal cross section of one example of the display medium of this invention and FIG. 4B is a top view of the display medium. The display medium shown in FIG. 4A and FIG. 4B differs from the electrophoretic property evaluating cell of FIG. 3A and FIG. 3B in respect that an image forming medium 5 formed on a supporting substrate 1 and an electrode 2 is divided into plural elements by spacer members 6 made of acryl resin and has a thickness of not more than 10 µm, that the substrate 1 is made of flexible PET, and that a transparent film 7 is aimed at obtaining thermal recording by TPH or thermal stamp and, therefore, is formed by superposing an ITO as a transparent electrode 9 on a PET film 4.5 µm in thickness. For the purpose of embodying this invention in the form of a card, an extended electrode 8 is formed outside the display part. The reference numeral 14 stands for a spacer (which is omitted from the magnetic recording part and the non-rewriting display part because it has not been formed in a write service life test sample).

Figure 5:
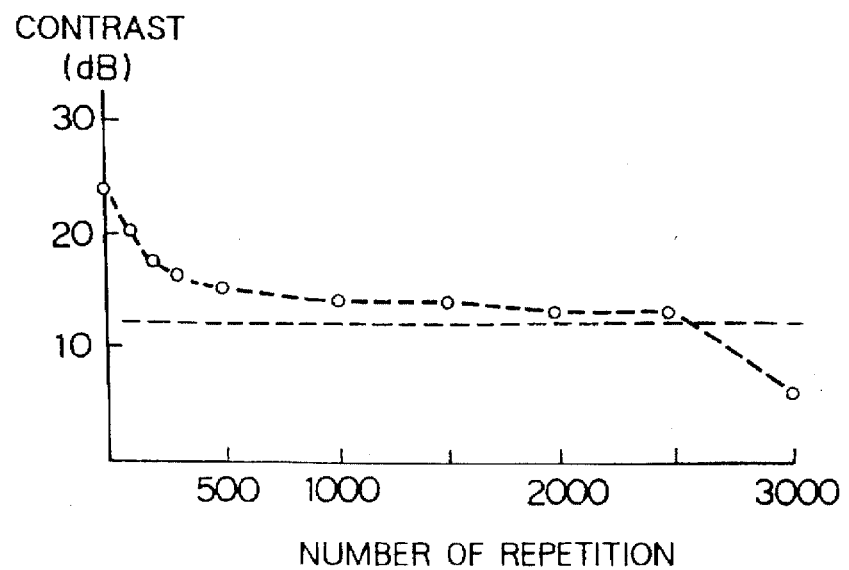
FIG. 5 is a diagram showing the results of a test conducted on the display medium of this invention to determine the relation between the number of repeating cycles of use and the contrast of image.

The card type display medium was subjected to a write service life test by the use of TPH. The writing was carried out under the conditions of 1 ms per line of speed and 0.45 mj/dot of maximum power (image density 8 dpm×15.4 dpm) and the erasure was effected with a heat roller. The applied voltage was fixed at ±30 V. The results of the test for number of repetitions and for contrast are shown in FIG. 5. As shown in the diagram, about 2500 cycles of operation were confirmed before the contrast fell to one half of the initial level. The fall of the contrast was caused by the PET film assuming translucency due to thermal deformation and abrasion. When the transparent medium is made of a substance capable of resisting thermal deformation and abrasion, it is thought to produce up to 3000 cycles of safe operation.

Figure 6A:
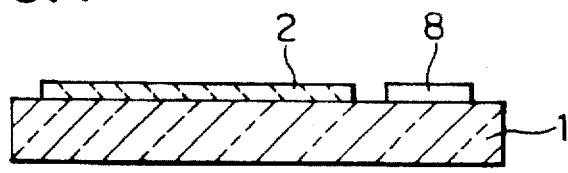
FIG. 6A through FIG. 6G are diagrams showing sequentially the component steps of the process for the production of the display medium of this invention.
Figure 6B:
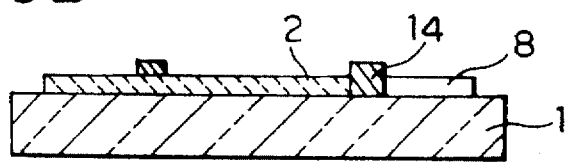
Figure 6C:
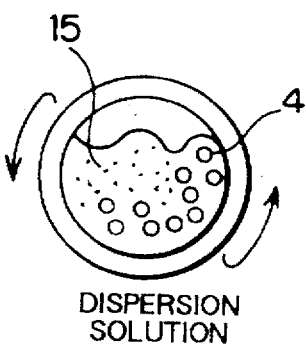
Figure 6D:
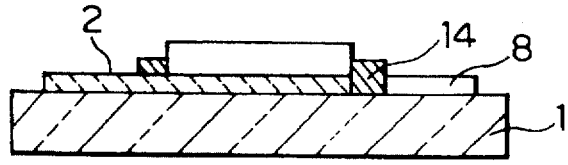
Figure 6E:
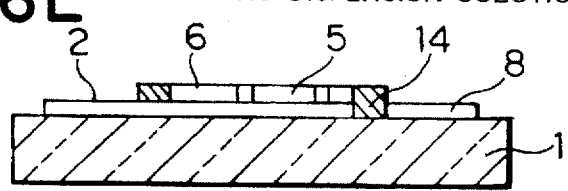
Figure 6F:
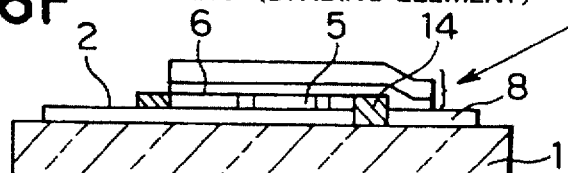
Figure 6G:
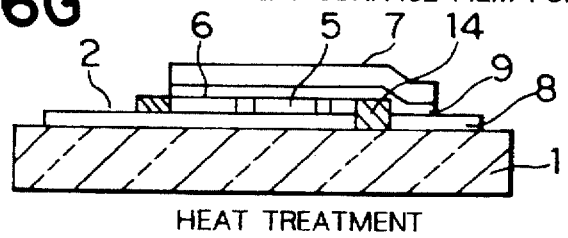

FIG. 6A through FIG. 6G show one example of a process for the production of the display medium of this invention. As shown in FIG. 6A, on one side of a supporting member 1 made of a flexible PET film, a thin Al film having a thickness of not more than 1 µm is formed as by the vacuum deposition technique, sputtering technique, electroless plating technique, screen printing technique, or gravure printing technique as a counter electrode 2. The electrode is patterned by the mask vacuum deposition (sputtering or plating) technique or the photoetching technique. Otherwise, a film containing a whole electrode pattern may be applied to the supporting member. A process which comprises first applying electroconductive paste in a prescribed pattern to a surface by the gravure printing technique and then thermally curing the applied pattern of paste enjoys high productivity and proves practicable. In consequence of the patterning, the counter electrode 2 and the extended electrode 8 are formed. Subsequently, a filmy spacer 14 is joined, when necessary, as shown in FIG. 6B. Then, as shown in FIG. 6C, a dispersion solvent A liquid having an alcohol type wax as a thermally fusible material, titanium dioxide particles as minute charging particles 4, an additive, and a dye dispersed in a solvent (such as, for example, toluene) and a dispersion solvent B liquid having a resin (such as, for example, a polyester type resin) having no sufficient compatibility with the alcohol type wax and a dye dispersed in a solvent (such as, for example, methylethyl ketone) are mixed to prepare a spacer material dispersion solution 15. This solution 15 is applied and dried as shown in FIG. 6D. In consequence of the drying treatment, there is Completed an island structure in which areas of an image forming medium 5 having the alcohol type wax, titanium dioxide particles, additive, and dye as main components thereof and areas of a spacer material 6 having the resin and dye as main components thereof are separated as shown in FIG. 6E. Though this structure has a large diameter distribution of divided cells of the image forming medium, it is at an advantage in enabling the image forming medium 5 and the spacer members 6 to be formed in one forming process. Further, after the image forming medium and the spacer members have been formed as shown in FIG. 6F, the surface of the spacer material resin is dissolved with a solvent and the ITO side of the PET film (4.5 µm in thickness) as a film 7 having a transparent electrode 9 formed thereon with ITO is caused to adhere in an airtight manner to the molten surface side of the spacer material resin. After the adhesion, the resultant laminate is heated to above the melting point of the image forming medium to ensure electrical connection of ITO to the image forming medium 5 as shown in FIG. 6G. The connection between the transparent electrode 9 and the extended electrode 8 is effected by the use of a flexible conductor or an electroconductive paste as occasion demands. Finally, the card consequently obtained is trimmed to a prescribed size to complete the process of production.

FIG. 7A through FIG. 7D show one example of the method for the production of an image forming medium and spacer members.

As shown in FIG. 7A, a solution 6a having minute particles 10 (20 µm in diameter) of unpolymerized polymethyl methacrylate (PMMA), for example, dispersed in an aqueous 5% polyvinyl alcohol (PVA) solution is applied as by the bar coating technique or the gravure coating technique on a counter electrode 2 formed on the Surface of a supporting substrate 1. By drying the layer of the solution 6a deposited on the counter electrode 2, spacer members 6 are formed as shown in FIG. 7B. Then, the resultant joined layers are immersed in a solvent (such as, for example, methylethyl ketone) and exposed to ultrasonic wave to expel the minute PMMA particles 10 as shown in FIG. 7C. Finally, an image forming medium 5 in a molten state is cast in the voids formed in the spacer material film in consequence of the expulsion of the minute PMMA particles 10 to obtain such a display medium as is shown in FIG. 7D.

FIG. 8A through FIG. 8D show another example of the method for the production of an image forming medium and spacer members.

A solution 6a having minute particles 10 (20 µm in diameter) of unpolymerized PMMA, for example, dispersed in an ultraviolet light setting acryl type monomer is applied in a thickness of about 10 µm as by the bar coating technique on a counter electrode 2 formed on a supporting substrate 1 as shown in FIG. 8A. Then, spacer members 6 are formed by setting the deposited solution 6a by exposure to an ultraviolet light as shown in FIG. 8B. Subsequently, the resultant joined layers were immersed in a solvent (such as, for example, methylethyl ketone) and exposed to an ultrasonic wave to expel the minute particles 10 of PMMA as shown in FIG. 8C. Finally, an image forming medium 5 in a molten state is cast in the voids formed in the spacer material 6 in consequence of the expulsion of the minute PMMA particles to obtain such a display medium as is shown in FIG. 8D.

The titanium dioxide particles used as the minute charging particles in the present embodiment are white. This invention does not limit the color of the minute charging particles to white but allows use of a combination of desired colors. This invention, therefore, permits formation of a desired multi-color image by selecting a combination of colored pigments. In a display medium, in which spaces divided by spacer members are severally filled with a plurality of thermally fusible materials having different melting points and incorporating pigments of different colors therein, a multi-color image can be formed on a plain background by repeating a write process sequentially with colors assigned to thermally fusible materials of decreasing melting points.

FIG. 9A through FIG. 9E show one example of the process for the production of an image forming medium and spacer members which are adapted for impartation of multiple colors to the image forming medium (adopting the screen printing technique). This process, for example, transfers a thermosetting epoxy resin in a thickness of about 10 µm by the screen printing technique to a substrate 1 to form thereon dams 6a destined to serve as spacer members as shown in FIG. 9A. Then, the dams 6a are set by heating to give rise to spacer members 6 for separation of elements. Subsequently, one color 5a of the background colors of the image forming medium is formed as by the screen printing technique at a prescribed position as shown in FIG. 9C. The image forming medium 5 is dried by a heat treatment as shown in FIG. 9D. After the steps shown in FIG. 9C and FIG. 9D have been repeated as many times as the colors which are used, the image forming material 5 is thermally melted to form such image forming medium and spacer members as are shown in FIG. 9E.

It is allowable to use the thermal ink transfer printing technique as part (the step of transfer of the image forming medium) of the process for the production of the image forming medium and the spacer members shown in FIG. 9A through FIG. 9E. This technique is characterized by causing an image forming medium containing minute charging particles of a given color to be transferred by the use of a thermal ink transfer printing system. This technique is at an advantage in attaining the formation of a film particularly of a thickness of not more than 5 µm in a high yield and obviating the necessity of using an organic solvent in the process. Owing to the great ease with which images of different colors are accurately registered, this technique has the advantage of allowing formation of accurately colored images.

The extended electrode realizes electrical connection by the use of an electroconductive roller, for example. As means for applying an electric field, a method for effecting non-contact supply to the electrode the ion produced as by a corona charger may be cited besides the method which realizes the electrical connection by contact.

Figure 10:
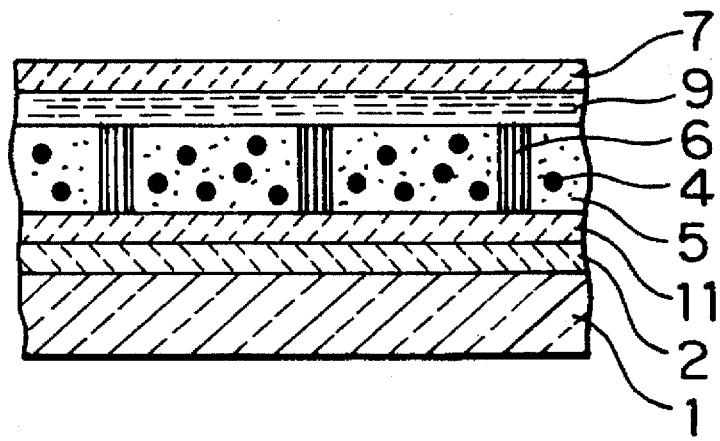
FIG. 10 is a schematic cross section showing another example of the display medium of this invention..
Figure 12:
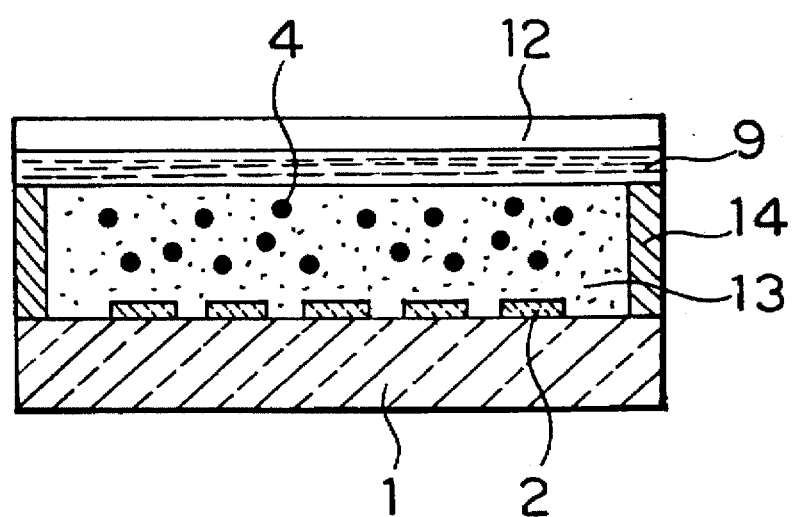
FIG. 12 is a schematic cross section of an electrophoretic element.

FIG. 10 is a schematic cross section showing another example of the display medium of this invention. The construction of this display medium results from the addition of an overwrite property which is unattainable in the embodiment of FIG. 1. To embody the function of overwrite, this aspect of the invention has as the basis of the display part thereof a construction which comprises a film containing a transparent electrode 9 on the inner side thereof and superposed on a transparent coating film 7, an image forming medium 5 divided into plural elements by spacer members 6 and containing minute charging particles 4, a pyroelectric film 11, and a counter electrode 2 superposed on a supporting substrate 1. The pyroelectric film 11 is formed with the crystalline state thereof so controlled as to generate an electric field opposite in direction to the applied electric field in response to an elevation of temperature.

Figure 11:
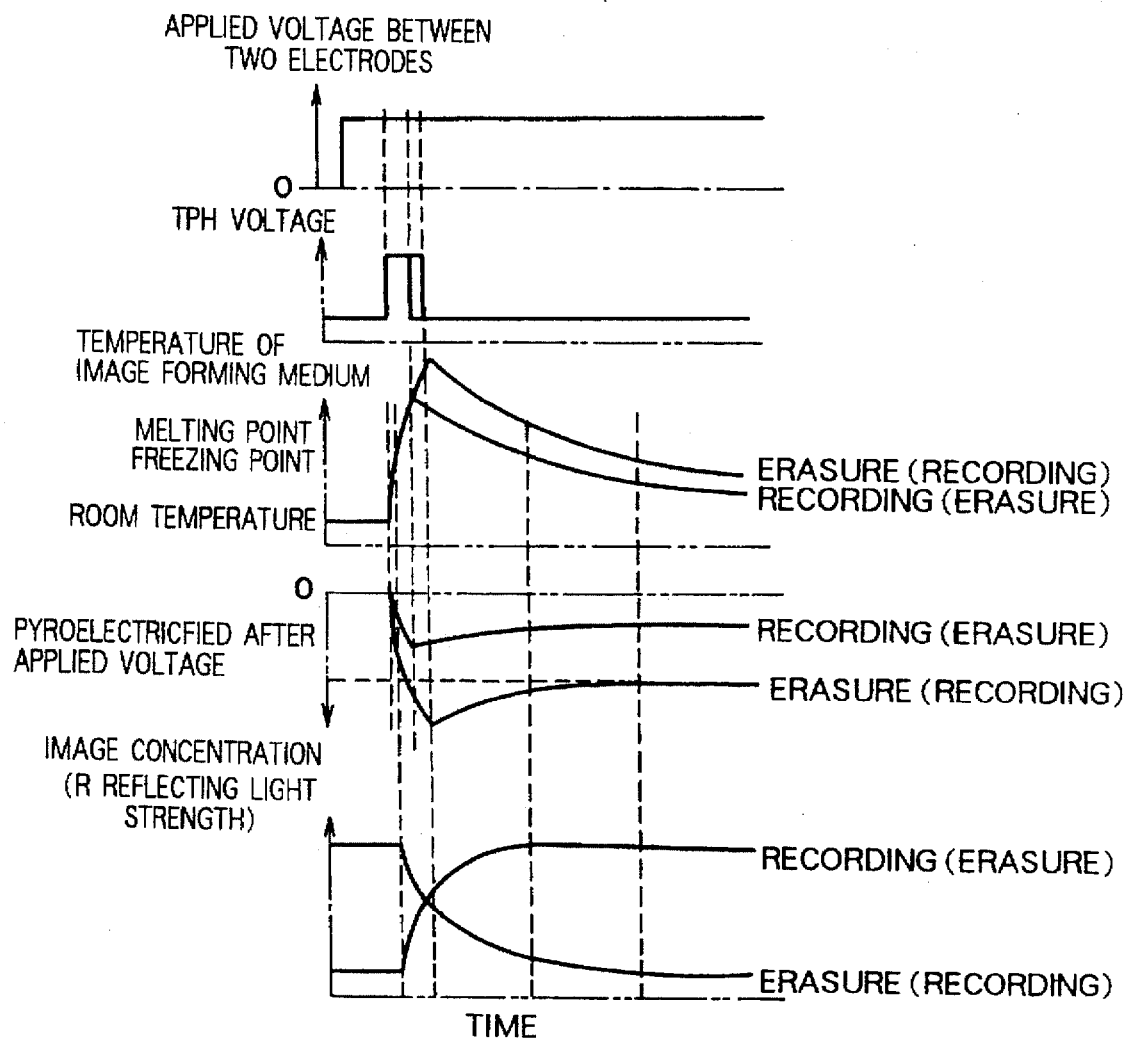
FIG. 11 is another example of the drive timing diagram according to this invention.

FIG. 11 illustrates another example of the drive timing diagram of this invention and aids in describing the operating principle of the overwrite image display. Preparatorily to the issuance of a picture signal, a voltage is applied to the transparent electrode 9 and the counter electrode 2 to apply a uniform electric field on the image forming medium 5. Then, the picture signal is applied in the form of heat as by means of TPH. The heat applied from the TPH causes a phase change of the image forming medium 5 into a flowable state and enables the minute charging particles 4 to be moved in the thermally fusible material 3 by the Coulomb force. The pyroelectric film 11 is caused by an elevation of temperature to generate an electric field opposite in direction to an applied electric field. Under the erasure (recording) condition, since the intensity of the applied electric field prevails, the minute charging particles 4 reach and adhere to the transparent electrode 9 before the thermally fusible material 3 is solidified, with the result the film assumes the color of the minute charging particles 4.

Conversely, under the recording (erasure) condition, an amply larger amount of heat is applied from the TPH than under the erasure (recording) condition. When the pyroelectric film 11 is thoroughly heated, it generates a pyroelectric field which surpasses an applied electric field in intensity and the minute charging particles 4 fall off the transparent electrode 9 before the thermally fusible material 3 in a molten state solidifies, with the result that the film assumes the color of the background.

What is particularly important for the construction under consideration is that, while the duration of the signal pulse applied to the TPH is within 1 ms, the molten state of the thermally fusible material be retained for a period of some tens of ms and the pyroelectric field be retained for a period of some hundreds of ms because of a slower forming property. As a result, the present construction enables an image to be displayed with a picture signal input of a speed too high to be followed by the conventional electrophoretic element and also realizes an overwrite image display operation which is never attained by the basic embodiment of FIG. 1.

Since the overwrite recording solely relies on the threshold of thermal energy to discriminate between recording and erasure, however, it inherently exhibits stability to withstand the ambient temperature in a narrower margin than the 2-pass recording. The overwrite recording and the 2-pass recording have merits and demerits of their own.

The display medium has been mainly described as comprising an image forming medium nipped between two layers of electro-conductive medium. This invention in its basic construction, however,.does not need to form an electroconductive medium inside the display medium. It, therefore, embraces a modification which has an electroconductive medium provided outside the display medium (as a system for the recording-erasing step). Besides the constructions described in the examples cited above, the present invention allows various selections of materials and compositions and enjoys a wide range of applications.

The display medium of this invention enjoys an increase in the number of repeated uses and the method for display by the use of this display medium enables a displayed image to be retained even in the absence of supply of energy as described above. Thus this invention provide rewritable recording media which find utility as prepaid cards, commutation tickets, coupon tickets, and passes in the field of transportation, prepaid cards, admission tickets, price tags, and similar cards in the field of distribution, and recording papers such as PPC papers capable of repeated use and thermographic papers capable of repeated use in the field of OA, for example.

What is claimed is:

1. A method for display on a display medium comprising the step of:

applying an electric field to said display medium which is provided with an image forming medium formed of a thermally fusible material having minute charging particles dispersed therein, applying heat to said display medium, and solidifying said image forming medium after formation of an image therein.

2. The method according to claim 1, wherein a picture signal is written in by means of said electric field or said heat during said step of applying said electric field or said step of applying said heat.

3. The method according to claim 1, wherein said step of applying said electric field consists in applying a voltage to said image forming medium nipped between two electrodes at least one of which is transparent through the medium of said two electrodes.

4. The method according to claim 1, wherein the intensity of said electric field is in the range of from $1\times10^5$ to $1\times10^7$ V/m.

5. The method according to claim 1, wherein said step of applying said heat consists in utilizing said electric field to impart such heat as enables said thermally fusible material to acquire a coefficient of viscosity capable of inducing electrophoresis of said minute charging particles within said thermally fusible material.

6. The method according to claim 1, which further comprises a step of heating said image forming medium which has an image formed therein and has been subsequently solidified and a step of applying to said electric field a reverse electric field.

7. A display medium, comprising a housing having at least one surface thereof made of a transparent material and an image forming medium disposed in said housing and composed of a thermally fusible material and minute charging particles dispersed in said thermally fusible material, whereby an image is formed in said image forming medium by applying heat and an electric field for the formation of an image to said housing and subsequently solidifying said image forming medium.

8. The display medium according to claim 7, wherein said image forming medium is nipped between two electrodes at least one of which is transparent.

9. The display medium according to claim 8, wherein Said application of an electric field is effected by applying a voltage through the medium of said two electrodes.

10. The display medium according to claim 7, wherein the formed image is erased by heating said solidified image forming medium and meanwhile applying to said electric field a reverse electric field.

11. The display medium according to claim 7, wherein said housing is divided into plural elements by spacer members.

12. The display medium according to claim 11, wherein said heating of said image forming medium is carried out at desired portions and the electrophoresis of only the minute charging particles in the portions of said thermally fusible material melted by said heating is controlled.

13. The display medium according to claim 12, wherein said electrophoresis lasts for a period longer than the period during which heat is applied to melt said thermally fusible material.

14. A display medium, comprising a housing having at least one surface thereof formed of a transparent material and an image forming medium disposed in said housing and composed of a thermally fusible material and minute charging particles dispersed in said thermally fusible material.

15. The display medium according to claim 14, wherein said thermally fusible material has a melting point of not less than 40° C. and a coefficient of kinetic viscosity of not more than $1 \times 10^{-4}$ $m^2 s^{-1}$ at 100° C.

16. The display medium according to claim 14, wherein said thermally fusible material is an organic compound containing at least one group selected from the class consisting of carboxyl group, alcohol hydroxyl group, amino group, and carbonyl group in the molecular unit thereof.

17. The display medium according to claim 14, wherein said thermally fusible material contains at least one material selected from the group of dye and pigment.

18. The display medium according to claim 14, wherein said minute charging particles are caused to acquire the property of electrophoresis in said thermally fusible material in a molten state by means of an electric field generated by positive or negative charging.

19. The display medium according to claim 14, wherein said image forming medium is nipped between two electrodes at least one of which is transparent.

20. The display medium according to claim 14, wherein said image forming medium is provided in at least one main surface thereof with a pyroelectric film.

* * * * *